United States Patent [19]

Smiler et al.

[11] Patent Number: 4,881,645

[45] Date of Patent: Nov. 21, 1989

[54] SECURITY CASSETTE HOLDR HAVING INTEGRALLY FORMED RETAINING RAMPS

[75] Inventors: Mark G. Smiler, Eagan; John E. Richard, Rockford, both of Minn.

[73] Assignee: Shamrock Industries, Inc., Minneapolis, Minn.

[21] Appl. No.: 211,244

[22] Filed: Jun. 24, 1988

[51] Int. Cl.⁴ ............................................ B65D 85/672
[52] U.S. Cl. ................................... 206/387; 206/807; 206/1.5
[58] Field of Search ......................... 206/387, 807, 1.5

[56] References Cited

U.S. PATENT DOCUMENTS

| | | | |
|---|---|---|---|
| 3,828,922 | 8/1974 | Holkestad | 206/387 X |
| 4,381,836 | 5/1983 | Rivkin et al. | 206/387 |
| 4,634,004 | 1/1987 | Mortensen | 206/387 |
| 4,714,161 | 12/1987 | Thorud | 206/807 X |

Primary Examiner—Arnold Rosenthal
Attorney, Agent, or Firm—Moore & Hansen

[57] ABSTRACT

A security holder consisting of a frame having an enclosed region presenting an opening through which an article such as a cassette may be inserted, and an extended handle portion which makes the holder difficult to conceal. A pair of opposing ramps which are slightly beveled and molded integrally into the side walls of the frame adjacent the opening of the enclosed region distort the frame when the article is inserted through the opening, and irremovably retain the article within the enclosed portion once the trailing edge of the article passes the ramps. In order to permit the frame to flex or distort sufficiently as the leading edge of the article is pressed through the opening between the ramps, a portion of the surface of the frame closely proximate to the ramps is cut, thinned, apertured, or otherwise weakened. Other angled projections on various portions of the holder frame are used to align or direct the motion of the article as it is inserted into the enclosed potion. The holder is molded from a highly translucent white polyethylene to permit viewing of the article directly through the frame, and once the article is received within the holder the frame cannot be manually manipulated or distorted to remove the article. A portion of the frame must be cut in order to remove the article.

21 Claims, 1 Drawing Sheet

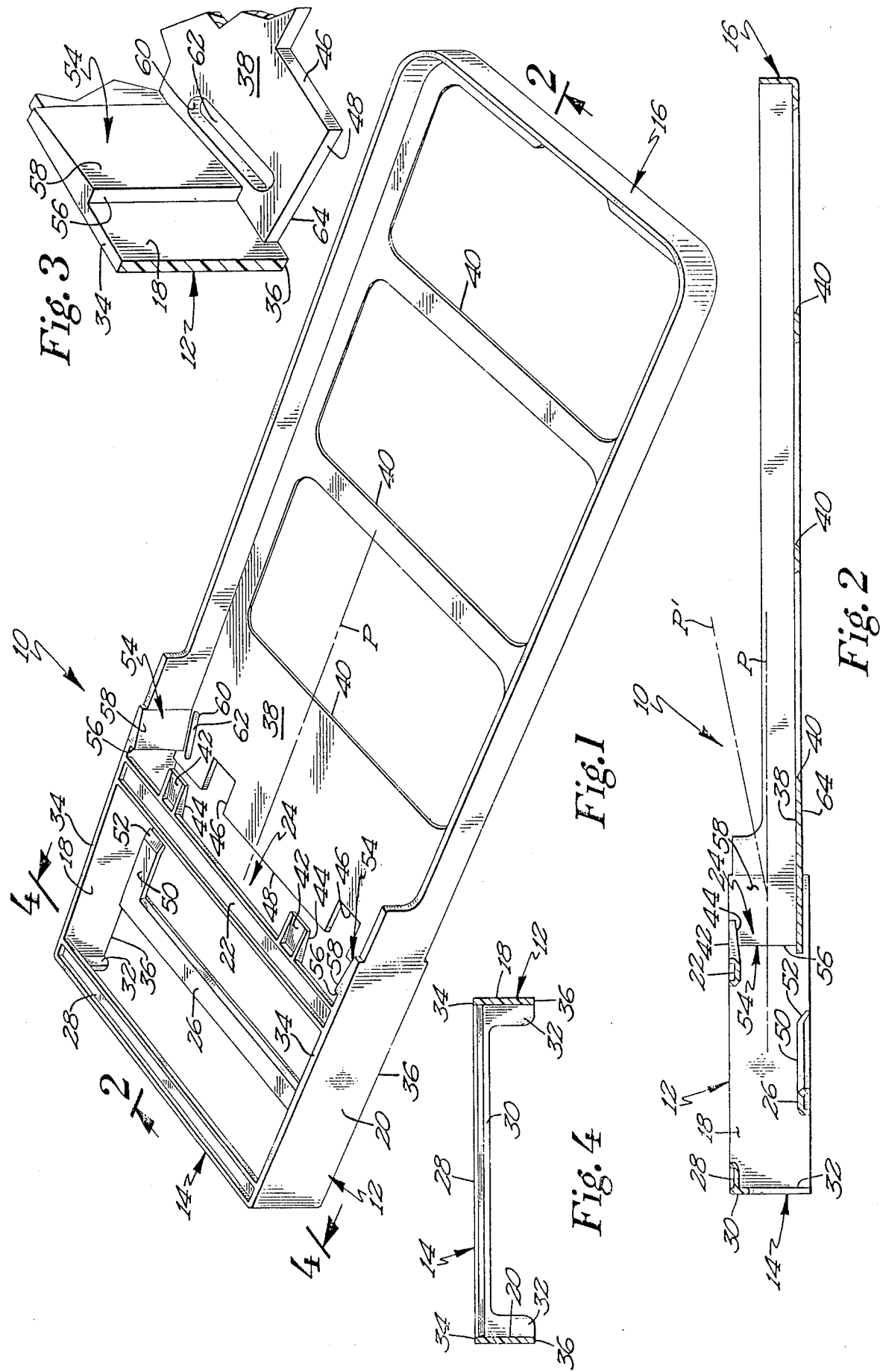

SECURITY CASSETTE HOLDR HAVING INTEGRALLY FORMED RETAINING RAMPS

BACKGROUND OF THE INVENTION

This invention relates generally to retail anti-theft packaging for tape cassettes, and particularly to a security cassette holder having integrally formed retaining ramps to restrict or prevent removal of a cassette tape from the security holder.

Several types of anti-theft packaging and security holders for tape cassettes are known to the art.

Display cabinets for placement in retail stores which permit viewing of several tape cassettes but which restrict removal of those cassettes unless authorized by store personnel are common. A representative example of such a display cabinet is shown in U.S. Pat. No. 4,243,142. Similar types of display cabinets have a plexiglass front wall having several circular ports through which customers may reach and examine tapes, but which do not permit their removal unless the glass front wall is opened. Such a display cabinet having a single port for use in combination with an audio cassette package is shown in FIG. 1 of U.S. Pat. No. 4,589,549.

Display cabinets of this type generally require store personnel to unlock the cabinet when a customer wishes to purchase a tape cassette, which is inconvenient or impractical in large stores where no specific personnel are responsible for that product area. Where several customers may require assistance simultaneously, such display cabinets place a large demand on the time of store personnel. Moreover, the customer is often left with an unfavorable impression, and may choose to refrain from further purchases.

Consequently, it has become more accepted for stores to package tape cassettes in oversized anti-theft holders, and display the tape cassettes openly on racks and shelves. The anti-theft holders do not restrict the customer's view of the tape cassette box, yet are large enough to prevent the tape cassette and holder from being easily concealed by a person attempting to steal the tape cassette. These anti-theft holders generally have a locking closure to retain the tape cassette within the frame or housing of the holder, with the tape cassette being removed at the point of purchase by the store personnel, or sold within the holder and removed by the customer by cutting open a portion of the frame of the holder.

Representative examples of such anti-theft holders for use with tape cassettes or eight-track tapes are shown in U.S. Pat. Nos. 3,871,516 and 4,381,836, each having a removable or pivotal lid to enclose the tape cassette within an oversized frame including a handle region. Another type of anti-theft holder incorporates a substantially enclosed frame or housing into which a tape cassette may be slidably placed, with the opening through which the tape cassette is inserted being closed by a plug or key, as shown in U.S. Pat. Nos. 4,285,429 and 4,714,161. The key or plug may also be fashioned to comprise one of the end walls of the frame itself, such as shown in U.S. Pat. Nos. 4,572,369 and 4,567,983. The mechanisms employed in such security cassette holders can become quite complicated, such as the device shown in U.S. Pat. No. 4,466,540 which utilizes a flyweight and magnetic field to control a locking mechanism.

Another type of security holder incorporates a plurality of pivotal tabs or projections positioned adjacent to the opening through which the cassette is inserted into the enclosure or frame, the tabs or projections restricting the insertion or removal of the cassette. U.S. Pat. No. 3,828,922 discloses a anti-theft packaging device in which five pivotal tabs are used, three tabs being aligned along one of the longitudinal walls, and two tabs positioned in a confronting arrangement with one tab adjacent each of the side walls. The walls of the frame are generally resilient or rigid, and the tabs are hingedly connected to the corresponding walls and separated or displaced at an angle therefrom. The cassette presses against and flexes the tabs outwardly when the cassette is inserted into the enclosure through the opening, the tabs moving relative to the walls of the frame rather than the frame itself being deformable. The walls adjacent to and disposed behind the tabs are cut away to allow the tabs to be pressed outwardly so as to be relatively flush with the walls, thereby permitting the minimum dimensional tolerances for the opening of the enclosure. Once the cassette is inserted into the enclosure, thereby allowing the tabs to spring back inwardly to their position restricting the opening of the enclosure, a tool is utilized to press the tabs outwardly such that the cassette may be removed. The cassette must therefore be removed at the time of checkout by a cashier or store employee.

A related concept for retaining the cassette within the frame or enclosure is disclosed in U.S. Pat. No. 4,245,741 wherein the cassette is held in place by a rib formed on the top face of the enclosure and a unidirectional hook-shaped retention member on the opposing surface. The frame is distorted when the cassette is inserted through the opening, with the leading edge of the cassette riding under the rib and the trailing edge being engaged by the hook. The retention members are pivoted on lever arms such that the enclosure may be indestructibly distorted as the cassette is inserted. Similar to the '922 device, the frame of this cassette holder is not flexed or distorted when the cassette is inserted, but the lever arms pivot relative to the frame.

U.S. Pat. No. 3,933,240 discloses a similar embodiment of a cassette security holder which employs a pair of more complicated multi-piece retention clips associated with spaced key slots for retaining the cassette. The clips are disposed on opposing side surfaces of the frame or enclosure adjacent to the opening through which the cassette is inserted. The cassette is removed by use of a release device located at the checkout counter, and the security holder is then reused. This cassette holder also includes an alarm activating trigger similar to those utilized to prevent the theft of clothing. Again, the frame of this security holder does not flex, but the clips may be moved relative to the frame.

Several common goals have been recognized in the design of such security holders, particularly for articles such as prerecorded cassettes and the like. First, it must be extremely difficult or impossible for a person to remove the article from the security holder while in the store without actually destroying or damaging the holder itself. The security holder must therefore be resistant to any manipulation or physical distortion which would permit removal of the article. Second, it is preferred that the article must be cut from the holder by the customer after the purchase, thus eliminating the need for complicated unlocking devices or the expenditure of time by checkout personnel, and thereby diminishing any opportunity for a person to tamper with the mechanism on the security holder. Third, since each holder is not reused and would therefore represent an expense to the store or customer. it is desirable to manufacture the holder at a minimum cost. Similarly, reducing the time or equipment necessary to insert the articles into the holders is an important goal, as well as eliminating the number or variety of separate pieces which the store personnel must use.

BRIEF SUMMARY OF THE INVENTION

It is therefore one object of this invention to design a one piece security holder for articles such as cassette tapes which is particularly inexpensive to manufacture using a minimum of raw materials, does not permit removal of the article from the holder without destroying the integrity of the holder itself, does not require tools or devices to insert the article into the holder, and which permits unobstructed viewing of the article within the security holder.

It is a related object of this invention to design the above security holder such that it may be integrally molded without the use of pivot levers or arms for retaining the article, and such that the molded article presents a minimum of surfaces or projections which make it difficult to mold or remove the holder from a mold.

Briefly described, the security holder of this invention consists of a frame having an enclosed region presenting an opening through which an article such as a cassette may be inserted, and an extended handle portion which makes the holder difficult to conceal. A pair of opposing ramps which are slightly beveled and molded integrally into the side walls of the frame adjacent the opening of the enclosed region distort the frame when the article is inserted through the opening, and irremovably retain the article within the enclosed portion once the trailing edge of the article passes the ramps. In order to permit the frame to flex or distort sufficiently as the leading edge of the article is pressed through the opening between the ramps, a portion of the surface of the frame closely proximate to the ramps is cut, thinned, apertured, or otherwise weakened. Other angled projections on various portions of the holder frame are used to align or direct the motion of the article as it is inserted into the enclosed potion. The holder is molded from a highly translucent white polyethylene to permit viewing of the article directly through the frame, and once the article is received within the holder the frame cannot be manually manipulated or distorted to remove the article. A portion of the frame must be cut in order to remove the article.

BRIEF DESCRIPTION OF THE DRAWINGS

FIG. 1 is a perspective view of the security holder of this invention taken from the handle end;

FIG. 2 is a longitudinal cross section view of the security holder of FIG. 1 taken through line 2—2 therein;

FIG. 3 is a partial broken perspective view of one retaining ramp and weakened area of th security holder of FIG. 1 taken from the enclosed end thereof; and FIG. 4 is a lateral cross section view of the security holder of FIG. 1 taken through line 4—4 therein.

DESCRIPTION OF THE PREFERRED EMBODIMENT

The security holder of this invention is shown in FIGS. 1–4 and referenced generally therein by the numeral 10.

Referring particularly to FIG. 1, it may be seen that the security holder 10 comprises a frame 12 integrally molded from a formable thermoplastic such as polyethylene, the frame 12 having a generally enclosed end region 14 and an open handle end region 16. The plastic material is generally pliant and flexible, but resists abrasion, stretching, and breaking. It is preferred that the plastic material be a near-clear or white translucent polyethylene of a thickness which permits printing on the article (not shown) to be read legibly through the plastic material, and such that colors can be easily distinguished.

The enclosed end region 14 consists of a pair of opposing and generally parallel spaced apart side walls 18, 20, the side walls 18, 20 being connected together by a first or top lateral web segment 22 proximate to the opening 24 of the enclosed region 14, a second or bottom lateral web segment 26 disposed midway along the length of the enclosed region 14, and a third or top end lateral web segment 28 disposed proximate to the end of the enclosed region 14 opposing the handle region 16. An end web 30 connected to and oriented generally perpendicular to the top end web 28 extends between the side walls 18, 20, the end web 30 extending from and being connected to a pair of opposing end tabs 32 which are in turn connected to and extend from the respective side walls 18, 20. The top lateral web segment 22 and top end lateral web segment 28 extend between the top edges 34 of the side walls 18, 20, while the bottom lateral web segment 26 extends between the bottom edges 36 of the side walls 18, 20. Each of the webs segments 22, 28, 30 has a generally U-shaped cross section as shown in FIG. 2

Extending between the bottom edges 36 of the side walls 18, 20 in the area adjacent to the opening 24 is a bottom wall panel 38 which continues away from the enclosed region 14 and into the handle region 16, the bottom panel defining a plurality of large apertures 40 within the handle region 16.

Referring particularly to FIGS. 1 and 2, it may be seen that projecting from the top web segment 22 away from the enclosed region 14 and across the top of the opening 24 are a pair of guide ramps 42 having lower surfaces 44 which angle upward slightly relative to the bottom wall panel 38 as the guide ramps 42 extend toward the handle region 16. The guide ramps 42 are each spaced inwardly from the corresponding side wall 18, 20 approximately one quarter to one third the width of the frame 12 measured between the side walls 18, 20. Each guide ramp 42 is disposed vertically over a generally rectangular cutout or notch 46 in the rear edge 48 of the bottom wall panel 38 having length and width dimensions slightly greater than those of the corresponding guide ramps 42. Each guide ramp 42 has a generally U-shaped cross section similar to that of the web segments 22, 28, 30.

Projecting from the bottom web segment 26 away from the enclosed region 14 and toward the bottom of the opening 24 approximately level with the bottom wall panel 38 are a pair of support ramps 50 having distal ends 52 which angle downwardly relative to the bottom wall panel 38 as shown in FIG. 2.

Referring particularly to FIGS. 1 and 3, it may be seen that molded integrally in fixed relation to and as a part of each side wall 18, 20 is a retaining ramp 54 having a generally planar end face 56 generally perpendicular to and confronting the opening 24 of the enclosed portion 14, and a generally planar side face 58 angled at a slight acute angle relative to the corresponding side wall 18, 20. The retaining ramps 54 consequently do not move or are not displaced relative to the side walls 18, 20 of the frame member 12. Referring to FIG. 2, it may be seen that the end face 56 of each retaining ramp 54 is beveled slightly from top to bottom, with a slight acute angle being formed relative to vertical such that the upper portion or top of the end face 56 is disposed closer to the opening 24 and enclosed portion 14 or further from the handle portion 16 than the lower portion or bottom of the end face 56. The side face 58 of each retaining ramp 54 may similarly be tilted or beveled such that the upper portion of each side face 58 extends inwardly toward the opposing retaining ramp 54 further than the lower portion of the retaining ramp 54. The bevel of the end faces 56 of the retaining ramps 54 may be reversed such that the top is disposed further away from the opening 24 than the bottom of each end face 56.

Referring to FIGS. 1 and 3, it may be seen that disposed closely adjacent to and generally parallel with each of the side faces 58 of the retaining ramps 54, and defined by and extending at least partially through the bottom wall panel 38, is a weakened area 60 having a generally oval or oblong shape. The weakened area 60 may comprise a cutout aperture extending completely through the surface of the bottom wall panel 38, or a thinned portion which extends partially through the bottom wall panel 38 but leaves a thin sheet or filament 62 of the plastic material generally parallel and flush with the bottom or outer surface 64 of the bottom wall panel 38. The weakened area 60 preferably has a major axis, such that the major axis is aligned generally parallel with the side face 58 of the retaining ramp 54, the weakened area 60 extending toward the opening 24 of the enclosed portion 14 a distance beyond the end face 56 of the retaining ramp 54 as shown in FIG. 3.

In operation, an article such a cassette (not shown) having length, width, and height dimensions substantially equal to the distance between the end web 30 and the end face 56 of the retaining ramps 54, the distance between the side walls 18 and 20, and the perpendicular distance between either top web segment 22 or 28 and the bottom web segment 26, respectively, is slidably inserted through the opening 24 and into the enclosed portion 14 of the frame member 12 along a generally linear path depicted by line P. The path P extends longitudinally along the length of the security holder 10 and between the retaining ramps 54 generally parallel to the side walls 18, 20 and the bottom wall panel 38 as shown in FIGS. 1 and 2. When inserting the article in this manner, the angled lower surfaces 44 of the guide ramps 42 contact the top edge of the article along the leading end thereof and press the article downwardly such that it passes under the edge of the top web segment 22. Alternately, the araticle may be inserted initially at a downward angel along path P' as shown in FIG. 2, such that the bottom edge of the article along the leading end thereof contacts the top of the support ramps 50 or the angled distal ends 52 thereof, which press the article upwardly such hat it passes over the bottom web segment 26.

As the article passes between the retaining ramps 54, the side edges of the leading end thereof contact the side faces 58 of the retaining ramps 54, which are disposed closer together than the opposing side edges of the article. As the article is forcibly pressed toward the enclosed portion 14 of the frame member 12 and against the side faces 58 of the retaining ramps 54, the pressure causes the side walls 18, 20 of the frame member 12 to flex or distort outwardly from their original position to widen the distance between the retaining ramps 54, and thereby permit the article to pass therebetween. Once the article has passed completely between the retaining ramps through the opening 24, and is thereby fully received within the enclosed portion 14, the pressure exerted by the article on the retaining ramps 54 is terminated, and the side walls 18, 20 return to their original position such that the end faces 56 of the retaining ramps contact or closely confront the rear end of the article and retain the article within the enclosed portion 14. The article is thereby engagingly received within the enclosed portion 14, and retained there by the retaining members 54 on one end, the end web 30 and end tabs 32 on the opposing end, the side walls 18 and 20 along the opposing sides, the top web and top end web segments 22, 28 along the top surface, and the support ramps 50 and bottom web segment 26 along the bottom surface thereof.

In order to remove the article from the security holder 10, it is necessary to cut one or more of the web segments 22, 26, 28, 30, preferably the end web segment 30 and top end web segment 28, which may be marked or imprinted with indicators designating where the webs 28, 30 are to be cut. In this manner, at least a portion of the frame member 12 must be destructively altered in order to remove the article from the enclosed portion 14, such that the integrity of the security holder 10 is diminished and therefore cannot be readily reused, rather than permitting removal of the article as the result of manipulation of the frame member 12 or the retaining ramps 54.

It is contemplated that other embodiments of the above security holder 10 may be fashioned, such as forming the retaining ramps 54 themselves from a generally resilient but deformable material such that they will be compressed as the article passes therebetween, but rebound to their original configuration once the article is fully received within the enclosed portion 14. It is also contemplated that the entire article need not be completely received through the opening 24 to be considered fully received and engaged within the enclosed portion 14, but merely that a sufficient portion of the article be received to prevent the frame member 12 from being manipulated or distorted manually, and such that edges or recesses along the sides of the article permit the retaining ramps 54 to return to their original positions along with the side walls 18, 20 and engage the rear edge of or recesses along the sides of the article.

Further, it is contemplated that the retaining ramps 54 may be placed along other portions of the frame member 12 adjacent or proximate to the opening 24, and that in some instances a single retaining ramp 54 may be used as the retaining means for retaining the article within the enclosed portion 14.

While the preferred embodiment of the above security holder 10 has been described in detail above with reference to he attached drawing figures, it is understood that various changes and adaptations may be made in the security holder 10 without departing from the spirit and scope of the appended claims.

What is claimed is:

1. A security holder for an article such as a cassette, said security holder comprising:
   a frame member having a generally enclosed region and a handle region connected to and extending from the generally enclosed region, said enclosed region defining an opening through which the article may be slidably inserted along a path and engagingly received within the enclosed region; and
   retaining means for retaining the article within said enclosed portion of said frame member such that the article cannot be removed from said enclosed portion without destructively altering a portion of said frame member, said retaining means including a pair of opposing retaining ramps integrally molded in a substantially fixed and unbending relation to and along said frame member at least partially obstructing said opening such that the article contacts the retaining ramps and deforms said frame member from an original configuration sufficiently to permit the article to be slidably inserted between said retaining ramps and through said opening with said frame member returning to said original configuration once the article is fully received within said enclosed portion.

2. The security holder of claim 1 wherein each of the retaining ramps has a generally planar end face oriented generally perpendicular to the path and confronting the opening for retaining the article within the enclosed portion, and a generally planar side face angled inwardly slightly relative to the path such that the article contacts and places increasing pressure against said side faces of the retaining ramps to deform the frame member as the article passes between the retaining ramps when the article is inserted through said opening.

3. The security holder of claim 2 wherein the end face of each retaining ramp has a top and a bottom, each end face being beveled slightly from top to bottom with a slight acute angle being formed relative to vertical such that the bottom of the end face is disposed further away from the enclosed portion and closer to the handle portion than the top of the end face.

4. The security holder of claim 1 wherein the frame member includes at least one weakened area situated proximate to each of the retaining ramps and permitting the frame member to be deformed when the article is inserted through the opening of the enclosed portion.

5. The security holder of claim 4 wherein each of the retaining ramps has an end face oriented generally perpendicular to the path and a side face angled inwardly slightly relative to the path, and wherein the weakened areas extend at least partially through the surface of the frame, the weakened areas each having a generally oblong shape with a major axis being aligned generally parallel with the side face of the adjacent retaining ramp.

6. A security holder for an article such as a cassette, said security holder comprising:
   a frame member having a generally enclosed region and a handle region connected to and extending from the generally enclosed region, said enclosed region defining an opening through which the article may be slidably inserted along a path and engagingly received within the enclosed region; and
   retaining means for retaining the article within said enclosed portion of said frame member such that the article cannot be removed from said enclosed portion without destructively altering a portion of said frame member, said retaining means including at least one retaining ramp integrally molded in a substantially fixed and unbending relation to and along said frame member at least partially obstructing said opening such that the article contacts the retaining ramp and deforms said frame member from an original configuration sufficiently to permit the article to be slidably inserted past said retaining ramp and through said opening with said frame member returning to said original configuration once the article is fully received within said enclosed portion.

7. The security holder of claim 6 wherein the retaining ramp has a generally planar end face oriented generally perpendicular to the path and confronting the opening for retaining the article within the enclosed portion, and a generally planar side face angled inwardly slightly relative to the path such that the article contacts and places increasing pressure against said side face of said retaining ramp to deform the frame member as the article passes the retaining ramp when the article is inserted through said opening.

8. The security holder of claim 7 wherein the end face of the retaining ramp has a top and a bottom, the end face being beveled slightly from said top to said bottom with a slight acute angle being formed relative to vertical.

9. The security holder of claim 8 wherein the top of the end face is disposed further away from the enclosed portion and closer to the handle portion than the bottom of the end face.

10. The security holder of claim 8 wherein the bottom of the end face is disposed further away from the enclosed portion and closer to the handle portion than the top end face.

11. The security holder of claim 6 wherein the frame member includes at least one weakened area situated proximate to the retaining ramp and permitting the frame member to be deformed when the article is inserted through the opening of the enclosed portion.

12. The security holder of claim 11 wherein the retaining ramp has an end face oriented generally perpendicular to the path and a side face angled inwardly slightly relative to the path, and wherein the weakened area extends at least partially through the surface of the frame, the weakened area having a generally oblong shape with a major axis being aligned generally parallel with the side face of the retaining ramp.

13. A security holder for articles such as cassettes, said security holder comprising:
   a frame member having a generally enclosed region and a handle region connected to and extending from the generally enclosed region, said enclosed region defining an opening through which the article may be slidably inserted into and received within the enclosed region along a path; and
   retaining means for retaining the article within said enclosed portion of said frame member such that the article cannot be removed from said enclosed portion without destructively altering a portion of said frame member, said retaining means being integrally molded in a substantially fixed and unbending relation to said frame member and obstructing said opening such that said frame member deforms from an original configuration sufficiently to permit the article to be slidably inserted through said opening, and said frame members returns to said original configuration once the article is received within said enclosed portion, said frame member including at least one weakened area situated proximate to said retaining means and permitting said frame member to be deformed when the article is inserted through said opening of said enclosed portion.

14. The security holder of claim 13 wherein the retaining means comprises at least one retaining ramp having an end face oriented generally perpendicular to the path and a side face angled inwardly slightly relative to the path, and wherein the weakened area extends at least partially through the surface of the frame, the weakened area having a generally oblong shape with a major axis being aligned generally parallel with the side face of the adjacent retaining ramp.

15. The security holder of claim 14 wherein the number of retaining ramps is two and the number of weakened area is two, one of the weakened areas being positioned proximate to and aligned with each of the retaining ramps.

16. The security holder of claim 13 wherein the weakened area extends toward the opening of the enclosed portion a distance beyond the end face of the retaining ramp.

17. A security holder for an article such as a cassette, said security holder comprising:
a frame member having a generally enclosed region and a handle region connected to and extending from the generally enclosed region, said enclosed region defining an opening through which the article may be slidably inserted along a path and engagingly received within the enclosed region, said frame further including a pair of opposing side walls and a bottom wall panel extending between said side walls; and
retaining means for retaining the article within said enclosed portion of said frame member such that the article cannot be removed from said enclosed portion without destructively altering a portion of said frame member, said retaining means including a pair of opposing retaining ramps integrally molded in a substantially fixed and unbending relation to and along said frame member at least partially obstructing said opening such that the article contacts the retaining ramps and deforms said frame member from an original configuration sufficiently to permit the article to be slidably inserted between said retaining ramps and through said opening with said frame member returning to said original configuration once the article is fully received within said enclosed portion.

18. The security holder of claim 17 wherein the frame member includes a pair of weakened area defined by the bottom wall panel, one of said weakened areas being situated proximate to and aligned with each of the retaining ramps and permitting the frame member to be deformed when the article is inserted through the opening of the enclosed portion.

19. The security holder of claim 18 wherein the weakened areas extend partially but not completely through the bottom wall panel.

20. The security holder of claim 18 wherein the weakened areas extend completely through the bottom wall panel.

21. The security holder of claim 18 wherein the weakened areas have a generally oblong shape and extend toward the opening of the enclosed region beyond the end face of the adjacent retaining ramp.

* * * * *